Figure 1:
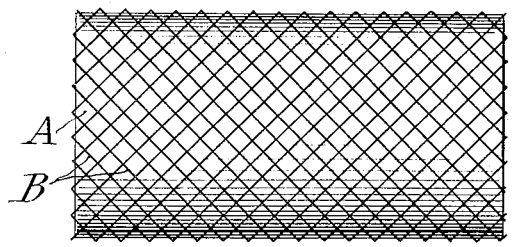

A. MACBETH.
NON-METALLIC WALL FOR RESERVOIRS.
APPLICATION FILED AUG. 22, 1918.

1,325,448.

Patented Dec. 16, 1919.

INVENTOR
Allan Macbeth,
BY
Fraser, Dunk & Myers
ATTORNEYS.

UNITED STATES PATENT OFFICE.

ALLAN MACBETH, OF PARIS, FRANCE, ASSIGNOR TO STÉ. THE DUNLOP RUBBER CO. LIMITED, OF PARIS, FRANCE.

NON-METALLIC WALL FOR RESERVOIRS.

1,325,448.  Specification of Letters Patent.  Patented Dec. 16, 1919.

Application filed August 22, 1918. Serial No. 251,005.

*To all whom it may concern:*

Be it known that I, ALLAN MACBETH, a subject of the Kingdom of Great Britain, residing in Paris, France, have invented certain new and useful Improvements in Non-Metallic Walls for Reservoirs, of which the following is a specification.

The present invention has for its object a reservoir intended to contain hydrocarbons and capable of resisting without damage perforations caused by projectiles.

This reservoir, which is particularly applicable to aerial apparatus, does not contain any metallic parts, so that it avoids completely the disadvantage which the laceration of these parts offers, which occasions most of the time appreciable deteriorations in a protective sheathing provided to guard against leakages arising from perforations.

This reservoir may be conveniently constructed according to an exceedingly simple process. It is constituted broadly by a relatively flexible wall, capable of closing up itself its leakages after perforations, and maintained by a light frame work intended to impart the necessary rigidity.

In the majority of cases, the wall being of india rubber or a material which is more or less soluble in hydrocarbons, it is necessary to stretch over the interior a protecting layer of a substance which is not attacked by them.

The following description which gives by way of example one method of constructing the reservoir, forming the subject matter of this invention, will enable the peculiarities and advantages of this reservoir to be properly understood.

In this example, there are used as the flexible wall insensible to perforations, several sheets of india rubber, and as the protecting materials, layers of gutta percha and gum lac.

The reservoir is constructed in the following manner:

Upon a mold of metal or wood of the ultimate form or configuration of the reservoir to be constructed, are placed in succession the following products the thickness and quantity of which may vary according to circumstances.

(*a*) Several layers of gum lac or similar substances.

(*b*) Two or three millimeters of balata or gutta percha or similar materials.

When this has been done, there is added a light frame work of hardened or semi hardened rubber which is thus interposed between the impermeable wall and the protecting sheathing which is about to be constituted and the composition of which may be:

A sheet of vulcanizable rubber of from 2 to 3 millimeters in thickness.

Rubber containing little or no sulfur, 7 to 10 millimeters in thickness.

A sheet of vulcanizable rubber 2 to 3 millimeters in thickness.

The whole thus constituted is vulcanized in order to obtain a compact, rigid and homogeneous mass and there is thus obtained a reservoir devoid of any metallic parts and capable of resisting under good conditions the perforation by a large number of projectiles.

The reservoir may be finally surrounded by a light, lattice work metal or other framework, either to replace the framework of hardened rubber or to complete the rigidity conferred by this latter.

The accompanying drawing illustrates one mode of applying the invention.

Figure 2:
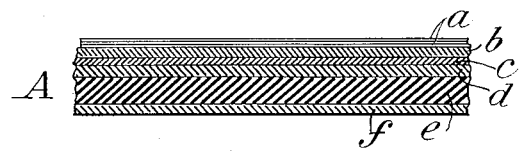

Figure 1 being an elevation or exterior view of the reservoir;

Fig. 2 a fragmentary section on a larger scale, and

Figure 3:
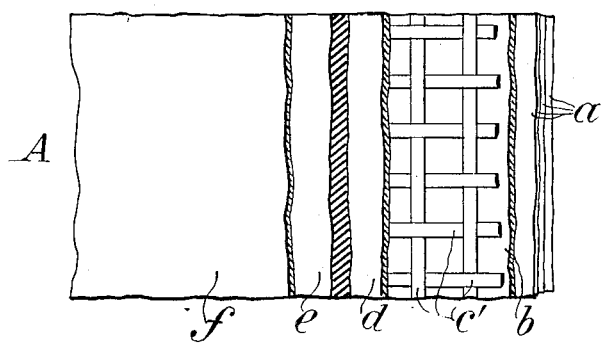

Fig. 3 a fragmentary dissected plan, the latter showing a modified location for the strengthening framework.

A is the reservoir as a whole and B the metal lattice or other framework.

In Figs. 2 and 3 *a* indicates the layers of gum lac or the like; *b* the layer of gutta percha, balata or similar substance; *c* the framework of hard rubber or semi-hardened rubber; *d* and *f* sheets of vulcanizable rubber, and *e* the intervening layer of non-vulcanizable rubber or natural gum.

In Fig. 3 the stiffening framework consists of a metal lattice *c'* in place of the hard rubber layer *c* and this may replace the external metal lattice B.

It must be understood that the methods of carrying out the process and constructing the reservoir may vary within wide limits, the principle of the invention, which consists in the absolute elimination of the metallic walls, being always the same.

What I claim and desire to secure by Letters Patent of the United States is:—

A petrol reservoir having a non-metallic wall, an inner coating of material insoluble in the lighter hydrocarbons and an outer self-sealing envelop comprising a layer of non-vulcanizable rubber and two sheets of vulcanized fabric between which said layer is confined.

In witness whereof, I have hereunto signed my name in the presence of two subscribing witnesses.

ALLAN MACBETH.

Witnesses:
    JOHN F. SIMONS,
    HENRI CARTIER.